IMAGE REPRODUCING APPARATUS

Filed Oct. 23, 1959 2 Sheets-Sheet 1

ROBERT M. STEWART
INVENTOR.
BY Allen E. Bohney
ATTORNEY

ROBERT M. STEWART
INVENTOR.

BY Allen E. Botney

ATTORNEY

United States Patent Office 2,969,531

Patented Jan. 24, 1961

2,969,531

IMAGE REPRODUCING APPARATUS

Robert M. Stewart, Encino, Calif., assignor to Space Electronics Corporation, Glendale, Calif.

Filed Oct. 23, 1959, Ser. No. 848,385

14 Claims. (Cl. 340—324)

The present invention relates in general to image-reproducing apparatus and more particularly to apparatus employing unique arrangements of light-contrasting areas to optically produce different images or patterns.

In accordance with the present invention, it has been found that a great deal of intelligence may be placed in a confined surface area by the use of space-shifted multiplex techniques. Using photographic film as an example, information is printed thereon through a half tone transparency and then the transparency is shifted slightly and additional information is printed. On readout, the transparency is placed over the printed material and suitably shifted to optically correlate to the desired printed intelligence. More particularly, a relatively large number of images or informative patterns may be printed on an area and reproduced therefrom by interlacing or multiplexing a number of halftones of the images to be reproduced on fine-grain photographic transparency film. The half tone dot structure is controlled to a sub-standard size so that although the images or patterns may overlap or be superimposed one upon the other, the dots forming one image do not themselves overlap with the dots forming other images. The film may be "read" by illuminating from the back and masking all but one desired set of dots with a mask of periodically spaced small transparent holes on an otherwise opaque film. In order to view a different image, the mask is incrementally moved so as to reveal a different set of dots.

It will be recognized that the present invention makes it possible to prepare reproductions of photographically printed material of greatly reduced effective size which, however, may be viewed at the original or an enlarged size with extremely simple equipment that does not involve a lens or projection system, as in the case of ordinary microfilm.

Another feature of the present invention is that it can be advantageously adapted for use in the field of outdoor advertising. In any such adaptation, a drive mechanism is provided which moves the mask cyclically through the sequence of images to be produced, thereby providing either a number of still-life pictures in succession or a simulation of motion. Such an advertising scheme would obviously be much more effective in advertising a service or product than the present day single-picture billboard.

A still further feature of the present invention is that it may be applied to cryptographic purposes if, instead of a recognizable pattern of holes, a "random" pattern of holes is used for exposing and reading the film.

The features of the present invention make it applicable with great advantage to many other fields too numerous to mention. By way of illustrating this fact, the present invention may be adapted for use as an analog-to-digital converter and this may be accomplished by displacing the mask in accordance with the amplitude of an analog signal. By so doing, images of a digital nature and corresponding to the mask displacement may be read out. Displacement of the mask may be provided by means of a motor that is driven by the analog signal. It will be obvious that the present invention may be adapted for use as a digital-to-analog converter as well.

It is, therefore, an object of the present invention to provide for the storage of relatively large amounts of optically reproducible information over the same area.

It is an additional object of the present invention to provide for increased information storage in an area by forming superimposed information patterns out of interlaced light-contrasting areas.

It is another object of the present invention to provide a pair of members that cooperate to produce images according to the displacement of one member relative to the other.

It is a further object of the present invention to provide a method and apparatus for recording relatively large amounts of intelligence on a confined surface area and selectively reproducing it.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only and are not intended as a definition of the limits of the invention.

Figures 1, 5:
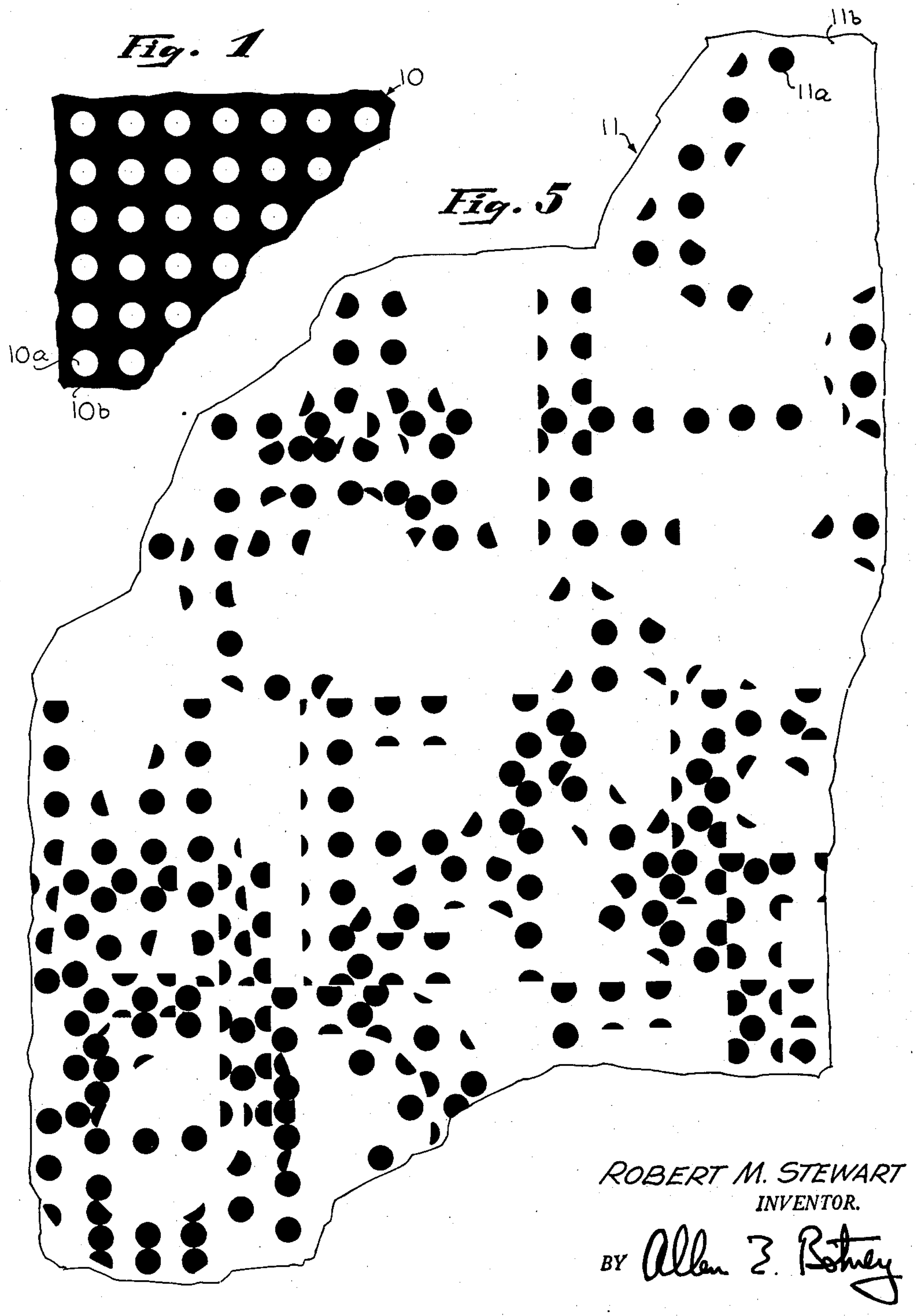
Fig. 1 illustrates a portion of a mask element according to the present invention.
Fig. 5 is a more accurate representation of the storage member of Fig. 2 and illustrates an interlaced or multiplexed arrangement of light-contrasting areas by means of which a sizeable number of overlapping or superimposed informative patterns are formed.

Referring now to the drawings, there is shown in Fig. 1 a portion of one member 10 of an embodiment of the present invention and, for reasons that will become clearer later, this member will hereinafter be referred to as mask member 10. As shown, mask member 10 is preferably a flat, plate-like type of member preferably, but not necessarily, made of photographic film and having periodically spaced small transparent holes or areas 10*a* on an otherwise opaque background area 10*b*. In other words, the arrangement on background area 10*b* resembles a polk-dot pattern. With respect to transparent holes 10*a*, it may be expected that for normal reading purposes the finest detail and maximum number of superimposed images may be obtained (limited only by photographic grain size) from the use of a mask which has approximately one hundred holes to the linear inch, each about one thousandth of an inch in size, the one thousandth of an inch referring to the diameter of the hole or area if it is round and to the length of an edge if the area is square. This choice of dimensions will result in a high quality of reproduction and as many as one hundred different images from a single square inch piece of the film.

It was mentioned above that mask 10 is preferably but not necessarily made of photographic film. It will be seen later that there may be instances, in the advertising field, for example, when the mask may be more advantageously constructed of materials other than film. Thus, it should be mentioned at this time that the construction of mask 10 is not to be limited solely to photographic material. It should also be noted here that the hole or transparent area dimensions cited above are illustrative in nature only insofar as a specific use may be involved and that the size of the holes and/or the spacing between them may vary over a range of dimensions according to the uses to which mask 10 may be put.

Figure 2:
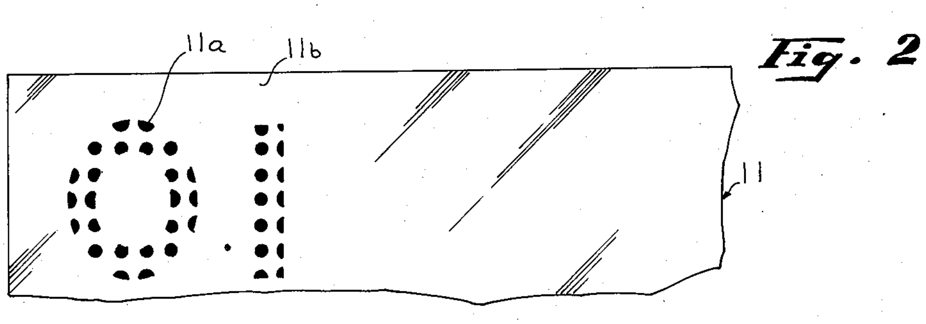
Fig. 2 shows a greatly oversimplified portion of an information storage member according to the present invention.

Referring now to Fig. 2, another member 11 of an embodiment of the present invention is shown therein and, as shown, member 11 is also preferably flat and plate-like in shape and has a number of opaque dots or small opaque areas 11*a* recorded thereon on a transparent background area 11*b*. Dots or small opaque areas 11*a* are formed into information or data patterns and for this reason member 11 will hereinafter be known as the "information storage" member or, simply, the "storage" member. Furthermore, it would be well to mention at this point that the word "dot" as used herein is being used in its broadest possible sense. Hence, "dot" may mean a small, circular, opaque area or it may mean a small, square-shaped, opaque area. It may also mean areas of the shapes described that are transparent on an opaque background area. In short, as used in the present application, the word "dot" is to be construed as any area of relatively small size that is in sharp contrast with the ambient or surrounding area and, therefore, even encompasses what may be termed a point source of light.

Returning now to Fig. 2, storage member 11 is a photographic film or plate and dots 11*a* are photographically recorded thereon. As mentioned, the dots are arranged in patterns and, for illustrative purposes, they are arranged to form two letters of the alphabet, namely, O and I on the portion of member 11 actually shown. However, they may be arranged just as well to form numerals, Morse code figures, or any other patterns that may be determined to be useful. It should also be mentioned once again here that the dots in Fig. 2 are actually arranged in an oversimplified manner in order to explain certain aspects of the invention and that when they are arranged fully in accordance with the present invention the dots forming different informative patterns would be interlaced or, stated differently, interspersed among themselves in such a manner as to produce superimposed patterns rather than the completely separated ones of Fig. 2.

Figures 3, 4, 6, 7:
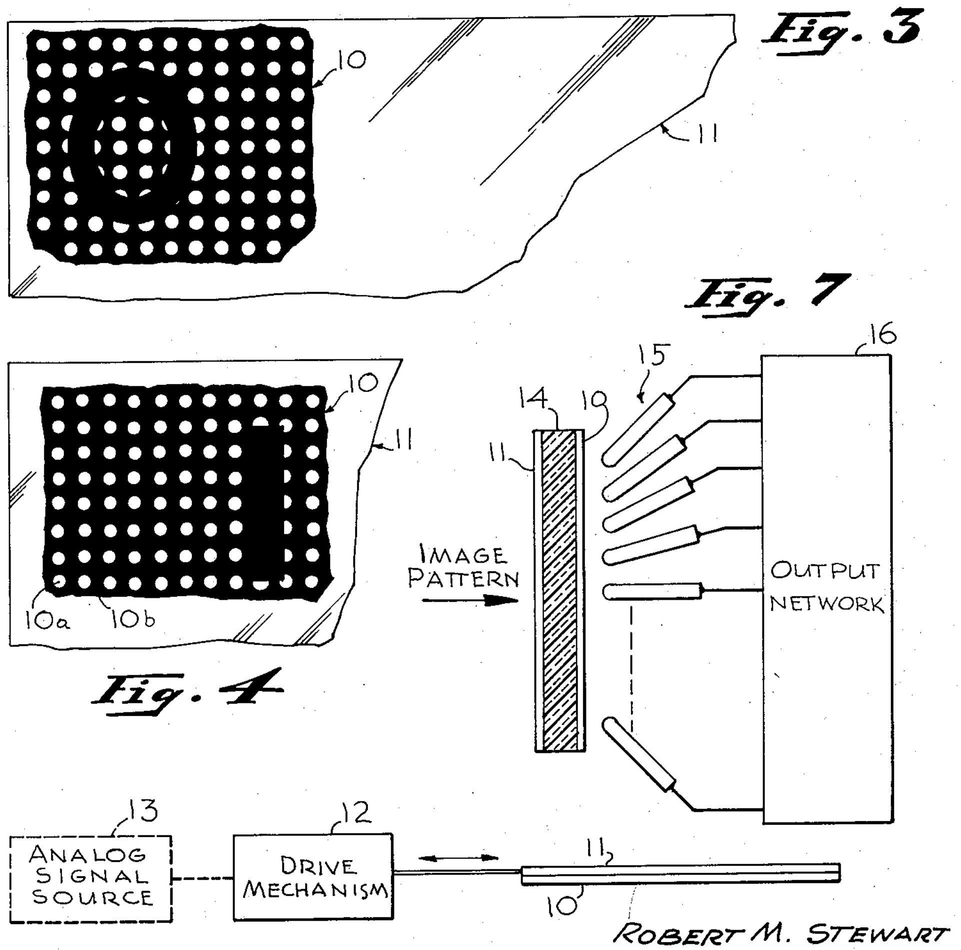
Fig. 3 illustrates the image-reproducing results obtained when the mask element is superimposed upon the storage member in one position.
Fig. 4 illustrates the image-reproducing results obtained when the elements of Fig. 3 are slightly displaced from each other.
Figs. 6 and 7 show how the elements of the present invention may be used in different ways to practical advantage.

For a consideration of the cooperative relationship of members 10 and 11, reference is made to Figs. 3 and 4 wherein member 10 is shown superimposed on member 11, that is, mask member 10 is in front of and in face-to-face relationship with storage member 11. Furthermore, in Fig. 3, there are shown to be aligned in such a manner that dots 11*a* forming the letter O coincide with, or, stated differently, are in registration with transparent holes 10*a*. As a result, the darkened letter O will appear to anyone viewing the combination from the front. On the other hand, the dots forming the letter I are so spaced from the dots forming the letter O that when the O dots are visible in the manner described, the I dots are hidden behind the opaque portion 10*b* of member 10 and are, therefore, invisible. It should be obvious at this time that by suitably moving either one of members 10 or 11, the dots forming the letter O will be displaced slightly and, therefore, fall behind the opaque portion of member 10. At the same time, of course, the dots forming the letter I will be displaced by an equal amount and, in consequence thereof, will now move into registration with transparent holes 10*a* of member 10. Thus, by an appropriate displacement of mask member 10 relative to storage member 11, the O will disappear and the I will appear to the viewer instead. A darkened I formed by the alignment of the I dots with the hole transparencies is illustrated in Fig. 4.

From what has heretofore been said it will be recognized by those skilled in the art that additional suitably arranged formations of dots on storage member 11 will make it possible to reproduce still other patterns or images of information through mask member 10, such as the letters of the alphabet used illustratively above, and that this could be done by successively aligning one or more of such dot formations with the transparent holes of member 10. Further, it will also be recognized that the movement of one member relative to the other is not restricted as to direction so that, in order to produce visible patterns through member 10, the moving member may be moved horizontally, vertically, slantingly, etc.

Thus, it will become immediately apparent that by weaving different forms or patterns of dots together to produce a multiplexed arrangement of them, a relatively large amount of information in the form of dot patterns may be recorded on the same relatively small area. The manner in which dots 11*a* may be interlaced and the sizeable amount of information that can result therefrom is illustrated in Fig. 5. Only a small portion of a much larger storage member is shown in Fig. 5 but informative patterns are nevertheless clearly discernible thereon and the non-overlapping interlacing of the dots is also quite clearly demonstrated.

In keeping with the definition of "dots" presented previously, it should be noted that information patterns may also be presented through member 10 by using formations of small transparent areas on an opaque background area rather than small opaque areas 11*a* on a transparent background area 11*b* as in Figs. 2 and 5. By constructing storage member 11 in this fashion, only the transparent holes forming a particular pattern on member 11 would be coincident with or in registration with the transparent holes of member 10, all the other holes on these members being out of registration with each other and, therefore, shielded by the opaque portions of members 10 and 11. As a result, light will pass through members 10 and 11 only where the transparent holes forming the said particular pattern are in registration with the transparent holes of member 10. This light will, therefore, have the configuration of the pattern of holes. By way of example, if the O and I dots of Fig. 2 are transparent holes on an opaque background, then light having either the configuration of an O or an I will pass through members 10 and 11 when either the set of O holes or set of I holes are in registration with transparent holes 11*a* of member 11. This arrangement can be extended further to produce a member 11 having interlaced transparent holes on an opaque background like the interlaced arrangement of member 11 in Fig. 5. Summarizing, it may be said that if the storage member of Fig. 5 is considered to be a negative, then a positive may be produced as well which will produce similar results.

Referring now to Fig. 6, members 10 and 11 are shown therein in combination with a drive mechanism 12, such as a motor, which cyclically moves one member (member 11 in the figure) in a closed path relative to the other member. As a result, a succession of patterns or images may be observed by a viewer. The succession of images may each be of the "still-life" type or they may combine to produce the semblance of motion. In any case, such an arrangement would obviously find useful application in the advertising field. Insofar as outdoor advertising is concerned, an array of small light sources properly arranged to form the desired overlapping patterns could be substituted for storage member 11 and a sheet of wood, metal, plastic, etc. with regularly spaced holes therethrough could be substituted for mask member 10. By moving the sheet past the array of light sources, different patterns of light would be successively presented through the holes for the reasons previously explained.

Drive mechanism 12 in Fig. 6 may be energized by an analog signal. Accordingly, an analog signal source 13 in dashed outline is shown connected to the drive mechanism, the displacement of mask member 10 by mechanism 12 being proportional to the amplitude of the analog signal. It will at this point be easy to conclude from what has been said that by using members 10 and 11 in conjunction with a drive mechanism 12 and an analog signal source 13, an apparatus is obtained that may be used as an analog-to-digital converter to convert the analog signal to images of a digital nature. A digitalized output may be produced by arranging the superimposed dot patterns on storage member 11 in a meaningful digital form. Conversely, by coupling the drive mechanism to a digital signal source and arranging the dot patterns on storage member 11 in a meaningful analog form, an apparatus is obtained that may be used as a digital-to-analog converter.

The sequence of operations constituting one method for preparing interlaced transparency 11 is as follows:

(1) Prepare mask member 10. This can be and has been done by projection and partial expose of the image of a standard lithographer's half-tone plate.

(2) Place a sheet of unexposed photographic film on the projection table of an enlarger.

(3) Lay mask member 10, prepared in step 1 above, over the sheet of unexposed film.

(4) Project a first image to be reproduced through mask member 10 onto the film.

(5) Move the mask member so that its opaque portions just cover the areas exposed in step 4 and uncover another set of small areas which were previously masked.

(6) Project the second image to be reproduced through the mask member onto the film as in step 4.

(7) Repeat steps 5 and 6 using other images to be reproduced until all available area of the film has been exposed to a sequence of non-overlapping spots.

(8) Develop the film. The resulting negative transparency (storage member 11) can now be "read" one image at a time as previously described, namely, by illuminating from the back and aligning the mask and storage members so that transparent holes 10*a* of the mask member coincide in succession with each pattern of dots 11*a* recorded on the storage member.

As mentioned previously, for normal reading material it is recommended that the mask member have up to 100 holes to the inch, each hole being as small as 1/1000 of an inch in size. This choice of dimensions will result in 100 different images on a single piece of film of a high quality of reproduction. The film itself may be either color or black-and-white film although a finer grain size is possible using black-and-white.

Color reproduction can also be obtained by using a mask member in which the different transparent areas or "holes" are tinted with the three primary colors (the information film still being black-and-white) or, possibly, based on the results of Land's two-color process, are alternately tinted with two colors. In the latter case, the two colors would not be directly superposed as in the Land experiments. However, similar results would be obtained as long as the dot spacing is less than the resolution of the human eye. Land's two-color process is shown and described in an article by Edwin H. Land, entitled "Experiments in Color Vision," published in the May 1959 issue of Scientific American, page 84.

Several uses to which the present invention may be adapted have been shown and described. However, the ones mentioned herein are but a few of the many uses to which it could be put. Thus, for example, the present invention may be applied to cryptographic purposes if, instead of a regular pattern of holes in the mask member, as shown in Fig. 1, a "random" pattern of holes is used for exposing and reading the film making up the information storage member. Again, it will be recognized by those skilled in the art that the present invention could find application in the fields of data processing, optical correlation, etc. and in providing various library services.

By way of example, another advantageous use to which the present invention may be put is shown in Fig. 7 wherein an optical correlation device is shown for simultaneously comparing a light pattern with all recorded patterns, a useful output signal being produced by the device where correlation of patterns most closely occurs.

As shown, the device of Fig. 7 includes a mask member 10 and an information memory member 11 of the types heretofore described. These members are separated by a third member 14 which is made of a transparent material, such as glass, plastic, etc. In close proximity to member 10 there is positioned an array of photocell elements, generally designated 15, the photocell elements preferably being oriented at different angles with respect to this member, as shown in the figure. The outputs of photocell elements 15 are connected to an output network 16 which receives electrical signals from the photocells and determines which of the signals is a maximum.

In operation, when a pattern of light is projected onto memory member 11, as indicated by arrow 17, this pattern of light is simultaneously applied to and, therefore, compared with, the transparent hole patterns of member 11 due to the different orientations of the photocell devices. In effect, the orientations of the photocells plus the separation of members 10 and 11 by member 14 are equivalent to displacing the mask and memory members from each other which, it will be remembered, produces successive pattern alignments and image reproduction. Accordingly, different amounts of light flux will respectively be received by the photocells, the photocell "seeing" the closest match between patterns receiving the maximum amount of light. Consequently, electrical signals of different amplitude will be produced by photocell devices 15 and applied to output network 16 wherein, by appropriate circuitry, such as by means of threshold circuits or a "greatest of" detector, the signal of maximum amplitude can be recognized. In this way, the light pattern being projected onto member 11 is also recognized. It will be recognized that the apparatus of Fig. 7 presents an opportunity to simultaneously compare large amounts of recorded data with some data input.

Having thus described the invention, what is claimed as new is:

1. In image reproducing apparatus including two elements in face-to-face relationship and means for shifting the elements, face along face, a slight extent relative to each other; the improvement which comprises providing each of the two elements with an area that is covered with a plurality of smaller light-contrasting areas, in one element the smaller areas being arranged in a polka-dot pattern and in the other element the smaller areas being arranged so that first and second numbers of them respectively form first and second data patterns with the second data pattern overlapping the first data pattern in such a manner that both patterns occupy substantially the same larger area.

2. In image reproducing apparatus including two elements in face-to-face relationship and means for shifting the elements, face along face, a slight extent relative to each other; the improvement which comprises providing each of the two elements with a large area that is subdivided into at least two intermediate-sized areas, each of said intermediate-sized areas being covered with a plurality of small light-contrasting areas, in one element the small areas in an intermediate-sized area being distributed over that area in a polka-dot pattern by itself not informative and in the other element the small areas in an intermediate-sized area being arranged so that first and second numbers of them respectively form first and second informative patterns, the second data pattern being arranged to overlap the first data pattern in such a manner that both patterns occupy substantially the same intermediate-sized area.

3. In image reproducing apparatus including two elements in face-to-face relationship and means for shifting the elements, face along face, a slight extent relative to each other; the improvement which comprises providing each of the two elements with at least one relatively large elemental area that is substantially covered with small light-contrasting areas, the large elemental areas and the small light-contrasting areas therein of one element being optically the negative of the elemental areas and the small light-contrasting areas therein of the other element, in one element the small areas in each large elemental area being arranged in a uniform pattern by itself not informative and in the other element the small areas in each large elemental area being arranged so that different pluralities of them respectively form different informative patterns that overlap each other in such a manner that they all occupy substantially the same elemental area.

4. Image reproducing apparatus comprising: first and second members positioned in a face-to-face relationship and adapted for face-along-face motion, said first member having an opaque area and a plurality of smaller light-passing areas therein uniformly spaced from each other to form a pattern that by itself is non-informative and said second member having basic area that has a relatively large number of light-contrasting smaller areas therein arranged in first and second pluralities, said first plurality of light-contrasting smaller areas forming a first informative pattern and said second plurality of light-contrasting smaller areas forming a second informative pattern that overlaps said first pattern in such a manner that both patterns occupy substantially the same basic area, said first and second pluralities of light-contrasting smaller areas being further arranged so that when the small light-contrasting areas forming one informative pattern are in registration with the small light-passing areas of said first member, whereby said one informative pattern is presented therethrough, the small light-contrasting areas forming the other informative pattern are out of registration with the small light-passing areas of said first member, whereby said other informative pattern is shielded from view.

5. The image reproducing apparatus defined in claim 4 wherein the basic area of said second member is opaque and the light-contrasting smaller areas therein are light-passing.

6. The image reproducing apparatus defined in claim 4 wherein the basic area of said second member is transparent and the light-contrasting smaller areas therein are opaque.

7. Image reproducing apparatus comprising: first and second photographic film members positioned in a face-to-face relationship and adapted to be laterally shifted with respect to each other, said first film member having small transparent areas recorded thereon in an opaque background area with the transparencies arranged in a polka-dot pattern by itself not informative, said second film member having a relatively large area in which are recorded a relatively large number of smaller light-contrasting areas with said smaller light-contrasting areas being arranged so that first and second pluralities of them respectively form first and second overlapping informative patterns, said second pattern being arranged to overlap said first pattern in such a manner that both patterns occupy substantially the same elemental area and when the small light-contrasting areas forming one of said informative patterns are in registration with the small transparent areas of said first film member, whereby said one informative pattern is visibly presented therethrough, the small light-contrasting areas forming the other of said informative patterns are out of registration with the small transparent areas of said first film member, whereby said other informative pattern is shielded from view.

8. Image reproducing apparatus comprising: a first plate-like member made of an opaque material having holes therethrough at substantially equal intervals to form a polka-dot pattern that by itself is not informative; a second plate-like member positioned in face-to-face relationship with said first member and having an array of light-producing elements thereon, said light-producing elements being arranged to form at least two overlapping informative patterns that occupy substantially the same elemental area, each pattern being made up of a different plurality of said elements, said light-producing elements being further arranged such that when the elements forming one informative pattern are in registration with the holes of said first member, whereby said one informative pattern is visible through said holes, the elements forming the other of said informative patterns are out of registration with said holes, whereby said other patterns are shielded from view; and means for shifting one of said members relative to the other to selectively bring said informative patterns into registration with said holes.

9. An analog-to-digital converter comprising: first and second members positioned in a face-to-face relationship and adapted for face-along-face displacement, said first member including an opaque element having a plurality of relatively small windows therein spaced from each other to form a pattern that by itself is not informative and said second member including an element having a relatively large area in which are disposed a relatively large number of light-contrasting smaller areas, a first plurality of said smaller areas being arranged to form a first digital pattern and a second plurality of said smaller areas being arranged to form a second digital pattern that overlaps said first digital pattern in such a manner that both said patterns occupy substantially the same elemental area, the small areas of said first and second digital patterns being further arranged so that when those small areas that form one digital pattern are in registration with the windows of said first member, thereby being visible therethrough, the small areas forming the other of said digital patterns are out of registration with said windows, thereby being shielded from view; and a signal responsive drive mechanism for moving one of said members relative to the other of them to bring different ones of said digital patterns into registration according to the displacement of said moving member, the displacement of said one member being determined by the amplitude of analog signals applied to said drive mechanism.

10. Optical correlation apparatus comprising: first and second spaced-apart members positioned in a face-to-face relationship, said first member having a large opaque area and a plurality of relatively small light-passing areas therein uniformly spaced from each other over said large area to form a pattern that by itself is non-informative and said second member having a large opaque area and a plurality of relatively small light-passing areas therein arranged to form a plurality of overlapping informative patterns that occupy substantially the same elemental area, said informative patterns being made up of different groups of small light-contrasting areas; a light-refracting third member positioned between and contiguous to the faces of said first and second member, the thickness of said third member being such that the light-passing areas of different informative patterns will appear to come into registration with and be visible through the small light-passing areas of said first member when said first member is viewed from respectively different angles; means for projecting a light image in the form of a selected one of said informative patterns against the large area of said second member; and an array of light-detecting elements in proximity to said first member, one such element for each of said informative patterns, said elements respectively being positioned and oriented to receive a maximum amount of light only from the associated one of said informative patterns, each element producing an electrical signal whose amplitude corresponds to the amount of light received by said element.

11. The optical correlation apparatus defined in claim 10 wherein said apparatus further includes apparatus coupled to said light-detecting elements for determining which of said elements is producing the signal of maximum amplitude.

12. Apparatus for optically reproducing patterns in color that were previously recorded in black and white, said apparatus comprising: first and second members positioned in face-to-face relationship and adapted for face-along-face motion, said first member having a large opaque area in which are disposed a plurality of differently colored small light-passing areas arranged to form a pattern that by itself is not informative, said second member having a large opaque area in which are disposed a large number of small transparent areas forming first and second informative patterns respectively made up of first and second pluralities of said small transparent areas, said second informative pattern being arranged to overlap said first informative pattern in such a manner that both patterns occupy substantially the same area, the arrangement of said first and second informative patterns being such that when the small transparent areas forming one informative pattern are in registration with the small differently colored light-passing areas of said first member whereby said one pattern in black and white is presented in color, the small transparent areas forming the other informative pattern are out of registration with the small differently colored light-passing areas of said first member, whereby said other informative pattern is shielded from view.

13. A digital-to-analog convertor comprising: first and second members positioned in a face-to-face relationship and displaceable with respect to each other in a face-along-face motion, said first member having an opaque area and a plurality of relatively small transparent areas distributed throughout said opaque area and arranged in a pattern that is not by itself informative, said second member having an opaque area and a plurality of relatively small transparent areas distributed throughout said opaque area and arranged to form a plurality of overlapping analog patterns that are respectively made up of different pluralities of said small transparent areas, said analog patterns being arranged to overlap in such a manner that they all occupy substantially the same area and when one analog pattern of small transparent areas is aligned with the small transparent areas of said first member so as to be viewable therethrough, the other analog patterns of small transparent areas are hidden from view by the opaque area of said first member; and an electrically-energizable drive mechanism coupled to one of said first and second members and operable in response to digital electrical signals applied thereto to displace said one member relative to the other to selectively align the analog patterns of said second member with the small transparent areas of said first member, the particular analog pattern aligned corresponding to the digital signal applied to said drive mechanism.

14. Image reproducing apparatus comprising: first and second members positioned in a face-to-face relationship and adapted for face-along-face motion, said first member being provided with a large opaque area substantially entirely covered with small transparent areas that are uniformly disposed over the large opaque area in a pattern that is by itself not informative, said second member being provided with a large area having a relatively large number of small light-contrasting areas arranged therein to form equal numbers of first and second informative patterns, said first and second patterns being arranged to overlap in such a manner that each pair of associated first and second patterns occupies substantially the same elemental area, the small light-contrasting areas of said second informative patterns being out of registration with said small transparent areas of said first member when the small light-contrasting areas of said first informative patterns are in registration with said small transparent areas of said first member.

References Cited in the file of this patent

UNITED STATES PATENTS

| | | |
|---|---|---|
| 2,275,017 | McNaney | Mar. 3, 1942 |
| 2,755,020 | Belcher et al. | July 17, 1956 |